June 30, 1970  E. C. ZIESCHANG, JR  3,517,832
APPARATUS FOR LOADING HAY
Filed July 15, 1968  3 Sheets-Sheet 3
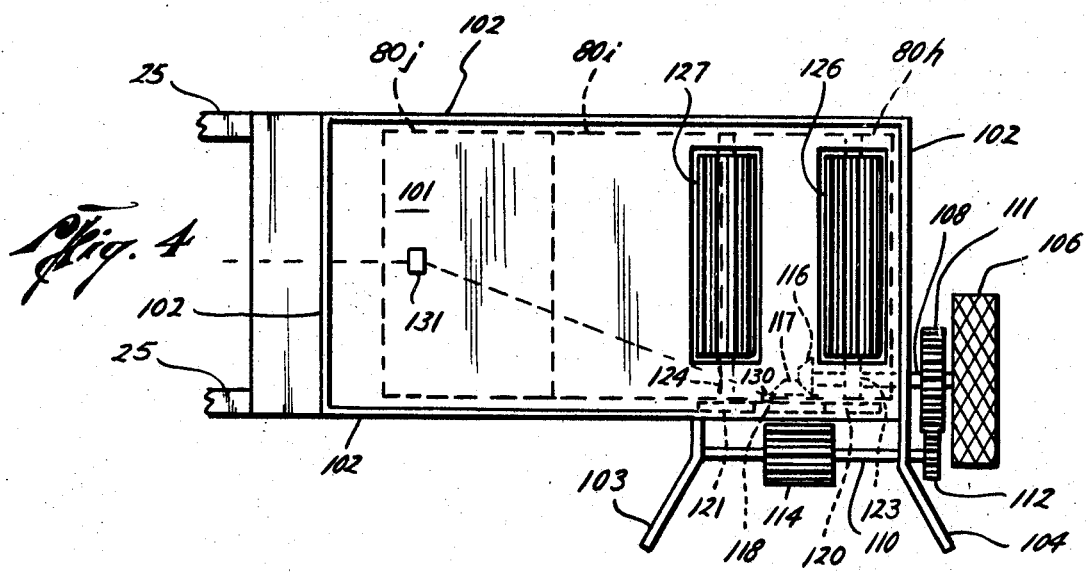
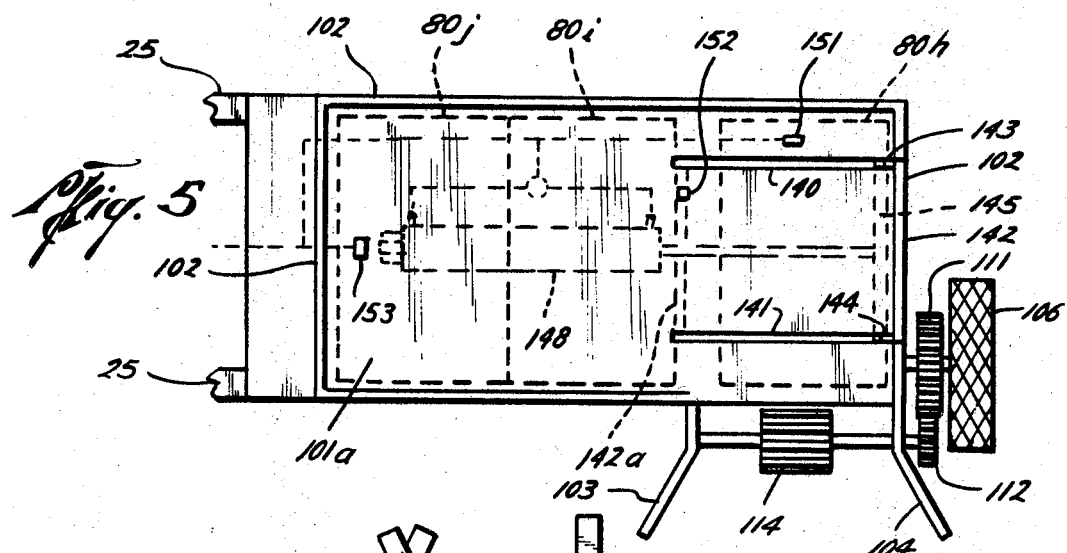
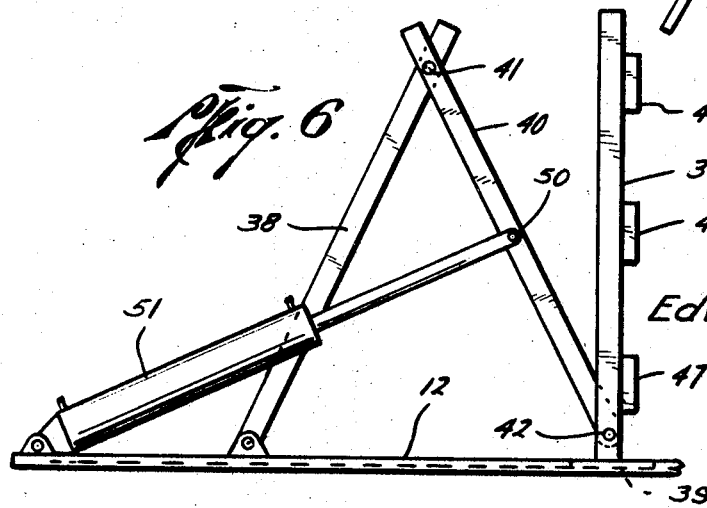
Edwin C. Zieschang, Jr.
INVENTOR.
BY Carl B. Fox, Jr.
ATTORNEY / 3,517,832
APPARATUS FOR LOADING HAY
Edwin C. Zieschang, Jr., Rte. 1,
Chappel Hill, Tex. 77426
Filed July 15, 1968, Ser. No. 744,943
Int. Cl. B65g 57/32; B60p 1/48
U.S. Cl. 214—6                                                8 Claims

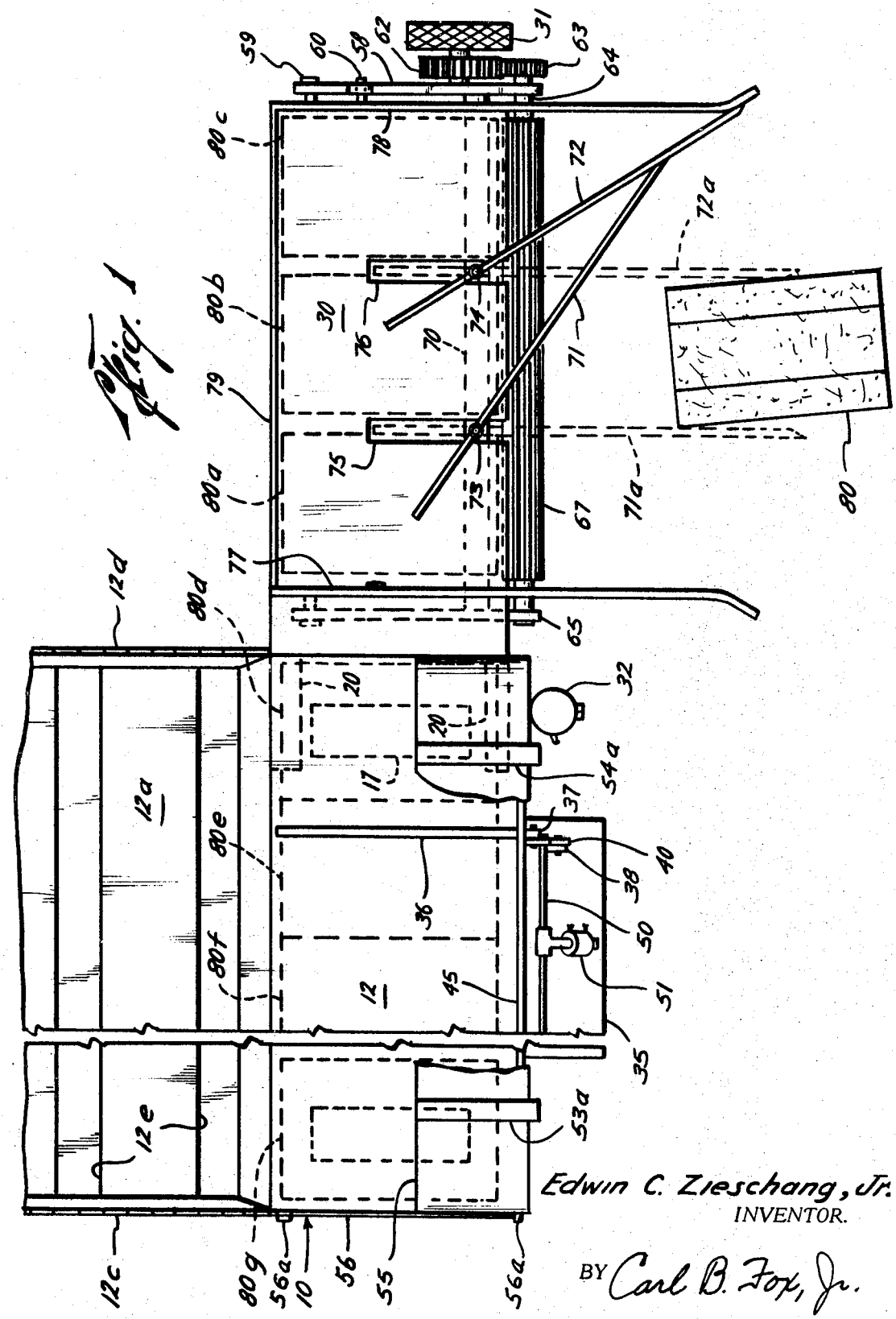

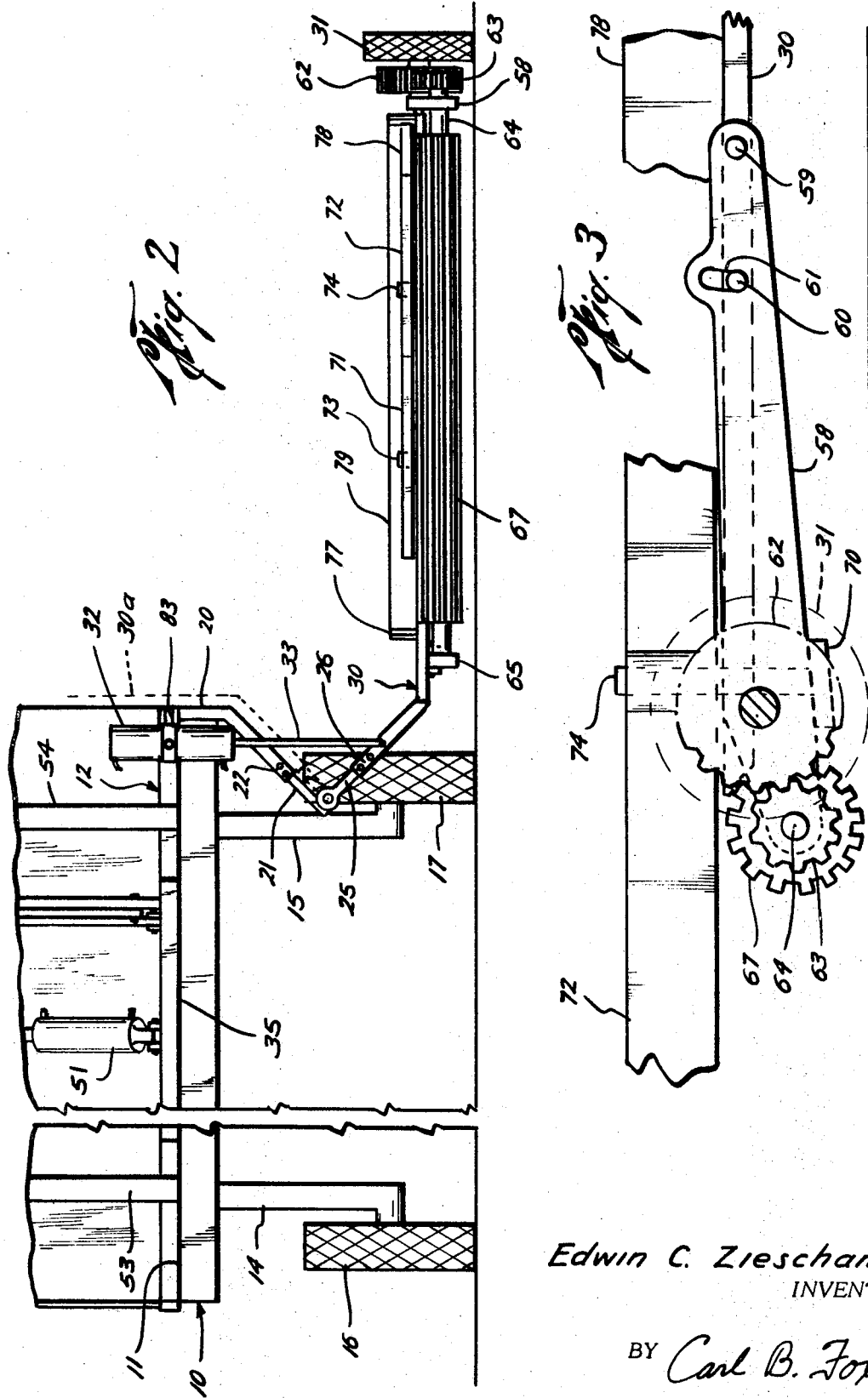

ABSTRACT OF THE DISCLOSURE

Apparatus for loading hay onto a moving vehicle. The hay is picked up by the moving vehicle at ground level and elevated to a platform or bed upon which the bales of hay are uniformly stacked.

BACKGROUND OF THE INVENTION

In loading hay upon trailers and trucks, the hay being baled and the bales left at more or less random locations about the field, much wasted effort is involved according to the conventional methods. The bales of hay are usually loaded by hand and stacked by hand upon a trailer or truck bed, this necessitating at least two or three persons, or more, to accomplish the loading job and to drive the motive vehicle. Also, it is often necessary that the truck or wagon be stopped at the location of each bale of hay to enable loading thereof. Some mechanical hay loaders are known, but none do the complete job of both picking up the bales of hay and stacking them on the truck or wagon. According to the invention, only one person is required for operation of both the conveyance, truck or wagon, and the loading apparatus, making the use of the apparatus very economical and profitable.

SUMMARY OF THE INVENTION

The invention, in combination with a truck or wagon, or the like, onto which the hay is to be loaded, includes a platform or bed which may be moved to be disposed horizontally just above ground level, and which may be moved to elevate bales of hay onto the loading bed, apparatus on the bed being provided for arranging and stacking the bales of hay without necessity of any personnel on the loading platform. The moving platform is hinged from the side of the loading platform and automatically picks up and arranges bales of hay from the ground as the vehicle moves over the ground, then in simple manner elevates the bales of hay to the loading platform in preformed stacks and arranges the stacks on the loading platform uniformly. All of the above described operations are handled by a single person who also operates the conveying vehicle.

BRIEF DESCRIPTION OF THE DRAWINGS

FIG. 1 is a plan view of the apparatus provided according to the invention.

FIG. 2 is a front elevational view showing a portion of the apparatus shown in FIG. 1.

FIG. 3 is an enlarged partial side elevational view of the apparatus of FIGS. 1 and 2.

FIGS. 4 and 5 are partial plan views showing alternative modifications of the movable platform portion of the apparatus.

FIG. 6 is a partial enlarged view showing a portion of the apparatus shown in FIGS. 1 and 2 in moved condition.

All of the drawing figures are in part schematic.

DESCRIPTION OF THE PREFERRED EMBODIMENTS

Referring now in detail to the drawings, and first to FIGS. 1-3 and 6, there is shown a wagon or trailer 10 upon which the apparatus according to the invention is disposed. Instead of a wagon, the vehicle may be the bed portion of a truck or any similar conveying vehicle, but for simplicity the vehicle will be referred to as a wagon hereinafter.

Wagon 10 may be pulled by a tractor, truck, or any other suitable motive vehicle or animal.

Referring now especially to FIG. 2, the bed 11 of the wagon has mounted thereon a flat platform structure 12, 12a which is shown to be coextensive with bed 11 of the wagon, but which may be of somewhat different size if desired. Platform 12 may be of any suitable form, preferably having a horizontal frame covered by a flat sheet forming the bed. The wagon bed 11 is shown to be supported by members 14, 15 carrying rotative wheels 16, 17, respectively. These are the forward wheels of the wagon, and an additional pair or pairs of wheels will customarily be provided to support the wagon for rolling movement.

A pair of identical supports 20 are spaced apart and depend downwardly and then angularly inwardly from one forward side of platform 12. The lower end portions 21 are telescoped within the upper portion of the supports 20 and are length-adjustable by movement of pins 22 in holes of the upper and lower portions of the support.

At its lower end, each support portion 21 has a hinge connection to a member 25 having a length adjustment 26. Members 25 are connected to the inner end of a movable bed or platform 30 the outer end of which is provided with a wheel 31. The platform may be of any form, preferably having a horizontal frame covered by a flat sheet forming the bed.

The arm length adjustments 22, 26 at each side of bed 30 are adjusted, depending upon the height of bed 12 from the ground, so that platform 30 is substantially parallel with the ground when in its lowered position as shown by full lines in FIG. 2. Platform 30 is pivotally moveable to the dashed line position 30a indicated in FIG. 2, with the platform then in vertical position against the side of the trailer and beds. A hydraulic cylinder 32 mounted at the front of bed 12 has its extendable arm 33 connected at its end to member 25 to draw platform 30 upwardly or downwardly as and when desired.

A small platform portion 35 extends from the front end of platform 12. Platform 12 has through its upper surface one or more slots 36 upwardly through which extend vertical supports 37, which are connected below the upper plate of platform 12 to enlarged slide elements 39 which together with the slots hold the supports 37 upright and slidable along the slots. At each slot 36, a pivotally movable angular arm member 38 (see FIG. 6) is pivotally connected to the platform 35 and to the upper end of a second pivotal arm 40 at pin 41, the lower end of each member 40 being connected pivotally at 42 to the lower end of one of the vertical supports or standards 37. The vertical supports are connected by a plurality of cross members 45, 46, 47, each of these being at a level at or near the centers of the bales of hay of a stack of three such bales. A cross bar 50 interconnects the members 40 and is movable in both horizontal directions by a hydraulic cylinder 51 connected at one end to bar 50 and at the opposite end to the forward end of platform portion 35. When cylinder 51 is extended, the standards 37 are moved to the right as shown in FIG. 6, and when cylinder 51 is retracted or withdrawn, the standards 37 are moved to the left as depicted in FIG. 6. The function of this portion of the apparatus will be clarified later on.

A pair of vertical supports 53, 54 mounted on the front of platform 12 are each bent rearwardly horizontally at their upper ends 53a, 54a. A horizontal plate 55 is affixed across underneath the horizontal portions of these supports and is slightly upturned at its right hand end as shown in FIG. 1.

Platform 12 has at its side opposite platform 30, a removable fence or side 56, having vertical posts 56a inserted and removable from U-shaped brackets or rectangular holes at the side of bed 12, as is usual in the art. Any other suitable form of removable side may be provided.

The second platform 12a, which is separate but connectable to platform 12, is positioned on wagon 10 rearward of platform 12, and usually and preferably coextensive with the rear bed portions of the wagon or trailer. Platform 12a has removable sides 12c, 12d which may be removed for unloading hay therefrom, and has cross troughs or slots 12e to enable insertion of the forks of a forklift to lift bales of hay from the platform. A plurality of such cross slots is provided consistent with the fork spacings and the length of the platform 12a. The sides 12c, 12d may, if desired, be hinged to the sides of the platform, for pivotal movement downwardly for access to bales of hay loaded on the platform.

Referring to FIGS. 1-3, the wheel 31 at the outer end of platform 30 is mounted for rotation on a pivotal arm 58 which is pivotally connected to the outer end of platform 30 at pin 59. A relatively larger gear 62 is mounted on the axle or shaft of wheel 31, and engages a relatively smaller gear 63 mounted on a cross shaft 64 journaled through a pivotal arm member 65 at its inner end, member 65 being pivotally affixed to the underside of platform 30 at its rearward end. A cog roller 67 is rotatable with shaft 64 and gear 63, at a rotational speed faster than that of wheel 31. When platform 30 is lowered to horizontal position with wheel 31 rolling upon the ground, rotation of the wheel upon the ground rotates gears 62, 63, whereby shaft 64 and cog roller 67 rotate in directions opposite the direction of rotation of wheel 31. Cog 67 is positioned at the front of platform 30 whereby as the platform approaches a bale of hay lying upon the ground cog 67 will lift the contacted end of the bale and move the bale onto platform 30. A cross bar 70 rigidly connects between elements 65 and arm 58, so that they move together when the platform is lifted.

A pair of bale guides 71, 72 are pivotally mounted on vertical shafts 73, 74 extending upwardly from cross bar 70 through slots 75, 76 of platform 30. An inner hay bale guide 77 is fixed to the upper surface of platform 30 and its inner end and extends forward from the front end of the platform. A guide strip 78 is similarly affixed to the upper surface of platform 30 at its opposite outer end. Guide arms 71, 72 are spring biased (springs not shown) at shafts 73, 74 toward the positions indicated by solid lines in FIG. 1. The force of a bale of hay moving against the rearward end of each pivotal guide member 71, 72 forces the guide member to the respective dashed line positions 71a, 72a, also as shown in FIG. 1.

With platform 30 unloaded, as shown by FIG. 1, upon approaching a bale of hay 80, the guide element 71 in conjunction with the other guide elements will direct the bale of hay to move to the left front of platform 30 to the left end of cog roller 67. The cog roller lifts the rearward end of the bale and elevates it to the platform and then moves the bale rearward upon the platform until it reaches a position 80a shown in dashed lines in FIG. 1. The bale of hay in moving onto the platform will move the guide rail 71 to its dashed line position 71a. Then, upon contacting another bale of hay, the guides will direct this second bale into the center position of platform 30 as represented at 80b. Then, upon approaching and contacting a third bale of hay, the cog roller 67 will move the bale onto the platform to a position 80c. It is, of course, necessary that the bale be contacted at the proper frontal part of the platform 30 depending on the then positions of the movable guide elements 71, 72. Thus, the first bale may be contacted at any point of the platform and the guide rails will direct it to the first or inner position 80a. Then the second bale must be contacted between the guide rail 71 in its position 71a and the outer guides. And finally, the third bale must be contacted between guide element position 72a and the frontal end of guide element 78 in order that the bales may be properly moved to position upon the platform. Proper direction of the motive vehicle for this purpose is easily accomplished.

Once the platform has been loaded with three bales of hay in the described manner (other numbers of bales in the stacks being possible), then the operator activates hydraulic cylinder 32 to elevate platform 30 to its vertical position against the side of the trailer. Side rail 77 enters a slot 83 along the side of the platform 12, the upper platform plate sliding to beneath the innermost bale in position 80a. Upon elevation of platform 30 (the guides 71, 72 being in their straightened positions 71a, 72a) the cross bar 70 drops downwardly because of downward pivotal movements of arms 58, 65, thus dropping the wheel 31 and gears downwardly and bringing the rearward end portions of guides 71, 72 down through the slots 75, 76 to clear the surface of platform 30. The bales in positions 80a–80c are thus enabled to slide freely along the platform 30 to rest upon the surface of platform 12. The stack of bales of hay remains in position 80d upon platform 12 until the next stack of three bales is moved thereonto, at which time this first stack is pushed to the left as in FIG. 1 to the next stack position 80e. As additional stacks of three bales each are added to the platform, they are pushed to the left as in FIG. 1 until finally the last bale of that row reaches position 80g. Then, hydraulic cylinder 51 is operated to extend the shaft thereof to move cross elements 45–47 on pedestals 37 to move the entire crossway row of stacks rearwardly onto platform 12d. Successive transverse rows of stacks of bales are pushed backwards onto platform 12a, or onto the wagon bed, as loading continues, until the wagon bed is filled to capacity.

Platform 12a may be omitted, and in such case the stacks are moved rearwardly on the trailer bed itself.

Upon pivotal lowering of platform 30 again to its horizontal position for reloading, the guide elements 71, 72 are moved by contact of wheel 31 with the ground upward from slots 75, 76 and resume their angular positions as shown by solid lines in FIG. 1.

The cross plate 55, slightly upturned at its righthand end as shown in FIG. 1, maintains the stacks against falling or moving out of position, as the resiliency of the supports 53, 54 exert a downward pressure upon the stacks each three bales high therebeneath on platform 12.

Referring now to FIG. 4 of the drawings, there is shown a pivotal platform 101 which is of modified form for connection to the apparatus to replace pivotally movable platform 30. Platform 101 has a smooth-surfaced plate forming its upper surface mounted on a flat frame of any suitable form and is connected to bed 12 by the support arms 25 heretofore described. A low rail 102 extends above the surface of platform 101 except at the entrance thereinto. At opposite sides of the bale entrance to the platform there are provided the forward-extending guide arms 103, 104.

A wheel 106 is mounted on an axle or shaft 108 rotatively supported through the housing frame. A cross shaft or axle 110 is supported between guide arms 103, 104, suitably journaled for rotation. Shaft 108 carries a relatively larger gear 111 and shaft 110 carries a relatively smaller gear 112 meshed with gear 111. Rotation of wheel 106 as the platform moves forward causes, through the engaged gears, rotation of cog roller 114 fixed to shaft 110 in the direction opposite the wheel rotation, and at a faster speed.

At the inner end of shaft 108 there is mounted bevel gear 116 engaging second bevel gear 117 which is connected through a clutch 130 for rotation with gear 118. Rotation of gear 118 through the described gear train rotates gears 120, 121 which are mounted on shafts 123, 124, respectively, each carrying a cog roller 126, 127, respectively. The opposite ends of shafts 123, 124 are journaled through suitable openings or bearings of the platform frame, in any suitable manner known in the art. Clutch 130 is engaged when switch 131 is not depressed, and is disengaged when switch 131 is depressed by a bale of hay.

The cog roller 114 moves the bales of hay onto the platform, the bales being guided by arms 103, 104 upon approaching the platform entrance. Once on the platform, the first bale is moved toward the left, toward the wagon 10, by the cog rollers 126, 127 which rotate because switch 131 is not depressed and clutch 130 is engaged so that rotation of wheel 106 causes their rotation in the direction to move the bales to the left. The first bale loaded is initially in position 80$h$ and is moved to position 80$i$ by cog rollers 126, 127. The next bale moved onto the platform by roller 114 first reaches position 80$h$ but is then immediately moved to position 80$i$, pushing the first bale to position 80$j$. The bale in position 80$j$ depresses switch 131 releasing clutch 130 so that rollers 126, 127 discontinue turning. Then, a final bale is moved to position 80$h$ by cog roller 114. Thereafter, platform 101 is moved pivotally upward to against the trailer as has been previously described in connection with platform 30, the three-bale stack of hay being placed on the trailer and handled thereupon as before.

Referring now to FIG. 5, elements shown therein which are the same as shown in FIG. 4 will not be re-described and will be referred to by the same reference numerals as appear in FIG. 4. Instead of the cog rollers 126, 127, the upper plate of platform 101$a$ of FIG. 5 has two spaced longitudinal slots 140, 141 therethrough. A movable vertical plate 142 has elements 143, 144 extending downwardly into the slots to be interconnected below the upper plate of platform 101$a$ by a rod 145 connected at its center to the shaft of a hydraulic cylinder 148 mounted beneath the upper plate of the platform. When the shaft of cylinder 148 is extended, the plate 142 is in the position shown by solid lines in the drawing. When the shaft or cylinder 148 is retracted plate 142 is in the dashed line position 142$a$.

A bale of hay moved onto the platform by cog roller 114 to position 80$h$ engages a platform switch 151 to depress it to platform level, which through a suitable relay and electrical system operating a solenoid-operated valve causes the operation of hydraulic cylinder 148 to move plate 142 to the retracted position 142$a$, thereby moving the first bale to position 80$i$. In moving to position 80$i$, the bale passes over platform switch 152, first depressing it and then releasing it, which activates an electrical control for causing return of cylinder 148 to its extended position to move plate 142 back to position 142. The first and second bales are moved to positions 80$i$, 80$j$ in the same manner. Upon the first bale reaching position 80$j$, platform switch 153 is depressed which deactivates platform switch 151 so that when the third bale comes to rest thereon in position 80$h$ the hydraulic cylinder 148 is not caused to operate. The bales loaded on the movable platform are moved to the trailer platform in the same manner as has been heretofore described.

In view of the fact that same may all be of any suitable conventional form, the electrical systems and solenoid-operated valves, and the necessary hydraulic lines and systems, have not been shown completely in the drawings. Many forms of solenoid-operated valves are known in the art, and a person skilled in the art may make proper selection without difficulty. The hydraulic systems of most conventional tractors will be adequate for operation of the apparatus, and the connection thereto of the various hydraulic conduits will be straightforward. In this connection. the apparatus in the form shown in FIGS. 1–3 and 6, and in the form including the FIG. 4 loading platform, require only two hydraulic operations, those of hydraulic cylinders 32 and 51, hydraulic output facilities for which are present on most conventional tractors. In the case of the side platform embodiment of FIG. 5, an additional hydraulic cylinder 148 is employed. But since only one of the two or three cylinders is operated at one time, a 2-way or 3-way valve will readily adapt their operation to two-output or one-output hydraulic sources. If conveyed other than by a tractor having an adequate hydraulic system, self-powered compressor or pump systems, well known in the art, will be conveniently employed.

Hay is baled in bales of somewhat different sizes, and the apparatus is designed for use with the customary sizes and may be adapted for use with bales of any sizes.

The beds of trucks, trailers, and wagons are more-or-less standard dimensions and since the platforms 12 and 12$a$ need not fit these beds exactly, the invention is adapted for use on beds of substantially all conventional forms. It will be realized that the apparatus may be made permanently into the bed of a truck, trailer, or wagon if desired, but in order that the vehicle may be used for other purposes it is not likely that this will frequently be desired.

As before stated, the platform 12$a$ need not be employed, and the crossways rows of stacks may be pushed backwards off of platform 12 onto the existing bed. It is, of course, desirable that the bed surfaces be smooth so that the bales and stacks will slide readily thereon.

The apparatus may be made to load the bales in stacks of three, as shown, or in other number. Any number of stacks of bales crossways and any number of rows of stacks lengthwise may be loaded.

For unloading, the fences 12$c$, 12$d$, may be made to be removable or may be hinged to fold downward into one or more layers to be out of the way for access to the fork-lift slots 12$e$. The last row of stacks, on platform 12, may be moved rearward by hydraulic cylinder 51 for unloading.

The movable platform 30, 101, or 101$a$, may be kept in its upward position whenever required for movement through gates, doors, or other restricted areas. The apparatus may readily be removed from a vehicle for storage when not in use, and may be readily replaced for use.

While preferred embodiments of the invention have been shown and described, many modifications thereof may be made by a person skilled in the art without departing from the spirit of the invention.

I claim:

1. Apparatus for loading bales, comprising first platform means mounted on a vehicle, wheeled second platform means hingedly connected to said first platform means for pivotal movements between a substantially horizontal position adjacent the ground with the wheel means thereof upon the ground and a substantially vertical position upward from a side of said first platform means, means for pivotally elevating said second platform means, said first platform means including means for receiving stacks of bales and for moving said stacks of bales for cumulative holding thereon, said second platform means including means for receiving individual bales from the ground for lifting side-by-side in stacks to said first platform means upon pivotal elevation of said second platform means from said horizontal to said vertical position; said means of said first platform means for moving said stacks of bales comprising frame means disposed across said first platform means including cross members aligned to meet the bales of said stacks and being disposed parallel with the rows of stacks placed on said first platform means and means for moving said frame means laterally to push a row of bales transversely upon said first platform means; said first platform means including resilient plate means supported to ride upon the uppermost bale of each stack of bales placed upon said first platform means by said pivotal elevation of said second platform means to retain each stack in upright position; whereby repeated placement of stacks in the described manner causing pushing of successive stacks to form said rows of stacks upon said first platform; and whereby each successive row of stacks may be pushed transversely by said frame means to enable formation of a succeeding row of stacks beneath said resilient plate means.

2. The combination of claim 1, said means for moving said frame means and said means for pivotally elevating said second platform means each comprising at least one hydraulic cylinder fixed between said first platform means and the moving element.

3. The combination of claim 2, said hinged connection between said first and second platform means comprising support means extending angularly from each said platform means pivotally pinned together at their ends, each said support means including length adjustment means whereby the vertical spacing between said horizontal and vertical positions of said second platform means may be adjusted depending on the height of said first platform means above the ground.

4. The combination of claim 3, said first platform means comprising a first platform portion for receiving said stacks of bales from said second platform means and a disconnectable second platform portion for receiving the rows of stacks moved transversely by movement of said frame means, said second platform portion having upwardly opening parallel slots to receive the forks of a fork-lift device; whereby when said second platform portion is disconnected and removed said frame means movements will push the rows of stacks to upon the bed of a vehicle supporting said first platform portion.

5. The combination of claim 3, said wheel means comprising a single wheel depending for rotation at the end of said second platform means away from said hinge means.

6. The combination of claim 5, said second platform means comprising flat bed means supported upon flat frame means, pivotal arm means connecting said wheel means to said frame means whereby said wheel means may be lowered when said second platform means is elevated, slot means through said bed means between adjacent bale positions, transversely pivotal elongate guides each pivotally mounted on shaft means disposed freely through a said slot means connected to said pivotal arm means, said guide means being disposed angularly of the slot means except when aligned with the slot means by contact with a bale on said bed, fixed elongate guide rails along the terminal bale position edges, cog means geared to said wheel means along the front of said bed means rotated by rotation of said wheel means upon the ground for moving successive bales from the ground to upon said bed means, whereby each successive bale contacts said guides to be directed to said cog means for lifting to a said bale position to move the adjacent pivotal guide to slot-aligned position, whereby when all bale positions are filled and all pivotal guides are moved thereby to slot-aligned position, elevation of said second platform causes said pivotal guides to drop into said slots to clear said bed for sliding of said bales to form a stack upon said first platform means.

7. The combination of claim 5, said second platform means comprising flat bed means supported upon flat frame means, first cog means disposed parallely through said bed means at an outer end portion of said bed means, gear train means connecting said wheel means to said cog means for rotation of said cog means upon rotation of said wheel means upon the ground whereby to shift a bale inwardly on said bed means, spaced bale entrance guide means for guiding bales to said outer end portion of said bed means, second cog means between said guide means geared to said wheel means for lifting successive bales to said bed means, whereby successive bales engaging said first cog means are moved inwardly to clear said outer end portion to receive a succeeding bale; means operated by a bale in an innermost bale position on said bed for stopping rotation of said first cog means whereby the last bale received upon said outer end portion of said bed is not moved inwardly.

8. The combination of claim 5, said second platform means comprising flat bed means supported on flat frame means, spaced entrance guide means for directing successive bales to an outer bale position on said bed, cog means disposed between said entrance guide means geared to said wheel means to move successive bales to said outer bale position on said bed, hydraulic ram means actuated by each successive bale in said outer bale position to move the bale inwardly from said outer bale position, switch means for contact by each successive inwardly moved bale for causing returning said ram means to its initial position outward of said outer bale position, switch means for contact by a bale in an innermost bale position to cause deactivation of said hydraulic ram means whereby the last bale reaching said outer bale position is not moved inwardly by said hydraulic ram means.

References Cited

UNITED STATES PATENTS

| | | |
|---|---|---|
| Re. 25,750 | 3/1965 | Adams et al. |
| 1,945,426 | 1/1934 | Euoy. |
| 2,716,503 | 8/1955 | Goddard _____ 214—80 X |
| 2,848,127 | 8/1958 | Grey. |
| 3,159,287 | 12/1964 | Stroup. |
| 3,251,485 | 5/1966 | Fancher. |
| 3,385,456 | 5/1968 | Snider. |

FOREIGN PATENTS

| | | |
|---|---|---|
| 163,386 | 6/1955 | Australia. |
| 203,313 | 9/1956 | Australia. |

ROBERT G. SHERIDAN, Primary Examiner

R. J. SPAR, Assistant Examiner

U.S. Cl. X.R.

214—7, 77, 518